United States Patent
Wan et al.

(10) Patent No.: US 11,384,410 B2
(45) Date of Patent: Jul. 12, 2022

(54) METHOD FOR DECOMPOSING MEDIUM-/LOW-GRADE SCHEELITE

(71) Applicant: Jiangxi University of Science and Technology, Jiangxi (CN)

(72) Inventors: Linsheng Wan, Jiangxi (CN); Liang Yang, Jiangxi (CN); Shuilong Wang, Jiangxi (CN); Hailong Wang, Jiangxi (CN); Xiang Xue, Jiangxi (CN); Xing Huang, Jiangxi (CN); Peng Liu, Jiangxi (CN)

(73) Assignee: Jiangxi University of Science and Technology, Gangzhou (CN)

( * ) Notice: Subject to any disclaimer, the term of this patent is extended or adjusted under 35 U.S.C. 154(b) by 340 days.

(21) Appl. No.: 16/714,788

(22) Filed: Dec. 15, 2019

(65) Prior Publication Data

US 2020/0190627 A1    Jun. 18, 2020

(30) Foreign Application Priority Data

Dec. 18, 2018 (CN) .......................... 201811550286.5

(51) Int. Cl.
| | |
|---|---|
| *C22B 34/36* | (2006.01) |
| *C01G 41/00* | (2006.01) |
| *C22B 1/00* | (2006.01) |
| *C22B 3/04* | (2006.01) |

(52) U.S. Cl.
CPC .............. *C22B 34/36* (2013.01); *C01G 41/00* (2013.01); *C22B 1/00* (2013.01); *C22B 3/04* (2013.01)

(58) Field of Classification Search
CPC .. C22B 34/36; C22B 1/00; C22B 3/04; C01G 41/00

USPC ........................................................... 423/53
See application file for complete search history.

(56) References Cited

U.S. PATENT DOCUMENTS

| | | | |
|---|---|---|---|
| 2013/0195737 A1* | 8/2013 | Zhao ....................... | C22B 34/36 423/56 |
| 2017/0299513 A1* | 10/2017 | Geddes .............. | A61K 49/0021 |

FOREIGN PATENT DOCUMENTS

| | | |
|---|---|---|
| CN | 105907993 A | 8/2016 |
| CN | 105969977 A | 9/2016 |
| CN | 108754123 A | 11/2018 |

* cited by examiner

*Primary Examiner* — Melissa S Swain

(57) ABSTRACT

The present invention discloses a method for decomposing medium-/low-grade scheelite, specifically comprising steps of: grinding medium-/low-grade scheelite, decomposing in an autoclave by using sodium phosphate and activated magnesium fluoride as leaching agents, and treating by solid-liquid separation to obtain crude sodium tungstate solution and residue. In this way, the medium-/low-grade scheelite is decomposed. Magnesium chloride is added in a sodium fluoride solution to prepare activated magnesium fluoride as a leaching agent. The present invention has the advantage that the high-efficiency decomposition of medium-/low-grade scheelite can be realized with low consumption of leaching agents, and the leaching cost can be greatly reduced in comparison to the existing decomposition processes using sodium hydroxide and sodium carbonate. This process is short in route, simple in operation, readily available and reliable in production equipment, and easy for industrialization.

5 Claims, No Drawings

METHOD FOR DECOMPOSING MEDIUM-/LOW-GRADE SCHEELITE

CROSS-REFERENCE TO RELATED APPLICATIONS

This application claims the benefit of priority from Chinese Patent Application No. 201811550286.5, filed on Dec. 18, 2018. The content of the aforementioned application, including any intervening amendments thereto, is incorporated herein by reference in its entirety.

TECHNICAL FIELD

The present invention relates to the technical field of smelting and separation of tungsten ore, and in particular to a method for extracting tungsten from medium-/low-grade scheelite.

BACKGROUND OF THE PRESENT INVENTION

The industrial tungsten ore is classified into scheelite and wolframite. Since wolframite is easy for dressing and smelting, tungsten smelting enterprises in China have mainly used wolframite for a long time. With the gradual depletion of high-quality wolframite resources that are easy for dressing and smelting, scheelite has become a main raw material in China's tungsten industry.

Although scheelite is abundant in China, due to low grade (81.4% of scheelite has a grade of below 0.4%) and fine disseminated grain size, scheeliteis typical refractory ore. For example, the oversized tungsten deposit, found in 2016 in Fuliang, Jiangxi in China, is low-grade complex scheelite. During the dressing of scheelite, the concentrate grade and the recovery rate are often contradictory. That is, if a higher concentrate grade is to be obtained, the recovery rate of scheelite will be low. If the grade of scheelite concentrate is appropriately decreased, the recovery rate will be greatly increased. For example, in the "Shizhuyuan method" developed in China, it has been found during the scheelite dressing that the standard scheelite concentrate with a content of $WO_3$ of 65% is produced with a recovery rate of 61.25%. If it is just required to select middling with a grade of 35.8%, the recovery rate may reach 85.9%, with an increase of about 25%. Therefore, in order to improve the overall recovery rate of scheelite resources, reducing the grade of flotation concentrate to produce medium-/low-grade scheelite which is then smelted is effective means for treating complex and refractory scheelite resources.

At present, main methods for decomposing scheelite in China and other countries include autoclaving using soda (Na2CO3) and decomposing using sodium hydroxide (NaOH). The autoclaving process using soda can decompose medium-/low-grade scheelite (the grade of WO3 is about 20% to 40%). However, a high decomposition rate is obtained with quite high consumption of soda, which is generally 5 to 6 times of the theoretical amount. Additionally, the soda solution is prone to caustic embrittlement at welds, resulting in potential safety hazards. The concentration of soda cannot be too high during the autoclaving process, so the equipment is low in productivity. The tungsten smelting enterprises in China mostly use the decomposition process using sodium hydroxide to treat scheelite. Due to the small reaction equilibrium constant of sodium hydroxide and scheelite, by taking advantage of the rapidly increased activity coefficient of sodium hydroxideat high concentration, in a leaching condition with a high NaOH concentration at a low liquid-solid ratio, sheelite is continuously reacted with NaOH, and the concentration of sodium tungstate is increased and supersaturated to result in crystallization. By the combination of leaching and crystallization, sheelite is leached efficiently, and the industrial application is realized. During the treatment of the sheelite concentrate having a WO3 grade of 65% by this process, if the consumption of sodium hydroxide is about 2.5 to 3.0 times of the theoretical amount, the leaching rate can reach above 98%.However, during the treatment of the low-grade tungsten ore having a WO3 grade of about 20%, even if the consumption of sodium hydroxide is 4.0 to 5.5 times of the theoretical amount, the leaching rate is only about 90%. If the sheelite has a lower grade and a higher content of calcium carbonate, it cannot be treated by the decomposition process using sodium hydroxide. Additionally, some researchers have proposed that, during the leaching of medium-/low-grade sheelite by the mixture of sulfuric acid and phosphoric acid, tungsten enters the leachate in the form of phosphotungstic acid and calcium enters the residue in the form of calcium sulfate. Additionally, a smelting process of decomposing sheelite by sodium fluoride may also be used. For the sheelite concentrate, when the consumption of sodium fluoride is 1.2 times of the theoretical amount, the tungsten decomposition rate can reach above 99%, but the concentration of residual sodium fluoride in the leachate is high, resulting in great burden for the subsequent wastewater treatment. Additionally, during the treatment of medium-/low-grade sheelite by sodium fluoride, the consumption of sodium fluoride is larger, the concentration of residual fluorine in the leachate is higher and the wastewater treatment is more difficult. The industrial application is limited.

SUMMARY OF THE PRESENT INVENTION

A main objective of the present invention is to provide a method for economically and efficiently extracting tungsten from medium-/low-grade scheelite, which solves the technical problems of high consumption of leaching agents, high production cost and low decomposition rate in the existing processes and improves the comprehensive utilization of low-grade refractory scheelite resources in China.

In order to solve the above technical problems, the present invention provides a method for decomposing medium-/low-grade scheelite. The medium-/low-grade scheelite is leached collaboratively by sodium phosphate and activated magnesium fluoride in an autoclave and then decomposed to obtain crude sodium tungstate solution and residue containing calcium and magnesium. The method specifically includes the following steps of:

(1) grinding the medium-/low-grade scheelite to below 325 meshes;

(2) preparing activated magnesium fluoride: adding magnesium chloride in an amount that is 1.1 to 1.3 times of the theoretical amount required to decompose scheelite in a sodium fluoride solution having a concentration of 30 to 40 g/L, and reacting at 60° C. to 80° C. to generate activated magnesium fluoride; and (3) adding the grinded medium-/low-grade scheelite in an autoclave, adding sodium phosphate, activated magnesium fluoride and water for hydrolysis, and treating by solid-liquid separation to obtain crude sodium tungstate leachate and residue containing calcium and magnesium.

Further, the content of $WO_3$ in the medium-/low-grade scheelite is 18 to 42 wt. %.

Further, in the step (2), the reaction time is 30 to 60 min, and the stirring speed is 200 to 350 r/min.

Further, the consumption of the sodium phosphate is 1.5 to 2.5 times of the theoretical amount required to decompose scheelite, and the consumption of the activated magnesium fluoride is 1.2 to 2.5 times of the theoretical amount required to decompose scheelite.

Further, the temperature for the decomposition reaction is 160° C. to 220° C., the liquid-to-solid ratio in the reaction system is 3:1 to 5:1 ml/g, the temperature holding time is 1.5 h to 5 h, and the stirring speed is 200 to 400 r/min.

The present invention has the following advantages. The medium-/low-grade scheelite is leached by sodium phosphate and activated magnesium fluoride, and the leaching reaction is accelerated by the high activity of the newly prepared magnesium fluoride, so that the efficient decomposition of scheelite is realized with low consumption of leaching agents. The decomposition rate of tungsten reaches above 96%. Moreover, the concentration of residual phosphorus in the leachate is controlled at a low level, and the problem of excessive harmful impurity phosphorus in the leachate during the subsequent ion exchange process is avoided. This process has the advantages of low production cost, high decomposition rate and easy industrialization.

DETAILED DESCRIPTION OF THE PRESENT INVENTION

The present invention provides a method for decomposing medium-/low-grade scheelite, including the following steps.

Step 1: The medium-/low-grade scheelite is grinded by a vibrating ball mill, the grain size of the grinded ore being below 325 meshes.

Step 2: Sodium fluoride solution having a concentration of 30 to 40 g/L is prepared and then added with magnesium chloride in an amount that is 1.1 to 1.3 times of the theoretical amount required to decompose scheelite; the mixture is reacted for 30 to 60 min at 60° C. to 80° C. and at a stirring speed of 200 to 350 r/min; and, at the end of reaction, the mixture is treated by solid-liquid separation, where the residue is activated magnesium fluoride for further use as a leaching agent for the medium-/low-grade scheelite, and the filtrate is a mother liquor containing magnesium chloride.

Step 3: The grinded medium-/low-grade scheelite is added in an autoclave, then added with sodium phosphate in an amount that is 1.5 to 2.5 times of the theoretical amount of sodium phosphate and activated magnesium fluoride in an amount that is 1.2 to 2.5 times of the theoretical amount of activated magnesium fluoride, and added with water at a liquid-to-solid ratio of 3:1 to 5:1 ml/g; the mixture is stirred and reacted for 1.5 h to 5 h at 160° C. to 220° C. and at a stirring speed of 200 to 400 r/min; and, the mixture is treated by solid-liquid separation to obtain leachate containing tungsten and residue containing calcium and magnesium.

It can be known from the chemical equilibrium that, during the leaching of scheelite, if the solubility product of resulting products is smaller, the reaction equilibrium constant of the scheelite decomposition is larger. It is advantageous for efficient decomposition of scheelite. On this basis, the present invention proposes that the medium-/low-grade scheelite is collaboratively leached by sodium phosphate and activated magnesium fluoride to generate calcium fluophosphate with a very small solubility (Ksp=$1\times10^{-59}$). In this way, the efficient decomposition of scheelite is realized. In this process, the activated magnesium fluoride is prepared by reacting sodium fluoride solution with magnesium chloride. Compared with the ordinary magnesium fluoride reagent, the activated magnesium fluoride has the characteristics of high activity and high dissolution rate, so that the leaching of scheelite is accelerated to obtain crude sodium tungstate leachate and residue containing calcium and magnesium. In this way, the efficient decomposition of the medium-/low-grade scheelite is realized with low consumption of leaching agents.

It is to be noted that, unlike the decomposition of scheelite by using sodium fluoride, magnesium fluoride will be slowly dissolved during the leaching process due to its low solubility and then reacted with sodium phosphate and calcium tungstate to generate calcium fluophosphate. Accordingly, excessive fluorine in the leachate is avoided, and the burden for the subsequent wastewater treatment is reduced. This process can overcome the disadvantages of high consumption of leaching agents, high production cost and low decomposition rate during the treatment of the medium-/low-grade scheelite by conventional processes of autoclaving using soda and decomposing using sodium hydroxide.

This process will be described below by embodiments. Although the technical solutions of the present invention are to be specifically described, the embodiments to be described are some but not all of the embodiments of the present invention.

Comparison Embodiment 1

120 g of the grinded (medium-grade) scheelite having a content of $WO_3$ of 42.3% was added in an autoclave, and then added with sodium phosphate in an amount that is 1.5 times of the theoretical amount required to decompose scheelite and ordinary magnesium fluoride in an amount that is 1.5 times of the theoretical amount required to decompose scheelite, where the liquid-to-solid ratio during the reaction was 5:1 mg/l. When the reaction temperature was up to 180° C., the system was reacted at a stirring speed of 250 r/min, maintained at this temperature for 2.5 h, and filtrated to obtain residue containing calcium and magnesium and crude sodium tungstate leachate, where the tungsten leaching rate was 94.3%.

Embodiment 1

Step 1: The medium-grade scheelite (having a content of $WO_3$ of 42.3%) was grinded by a vibrating ball mill, the grain size of the grinded ore being below 325 meshes.

Step 2: Sodium fluoride solution having a concentration of 40 g/L was prepared and then added with magnesium chloride in an amount that is 1.1 times of the theoretical amount required to decompose scheelite; and, the mixture was reacted for 30 min at 80° C. and at a stirring speed of 200 r/min and then filtrated to obtain activated magnesium fluoride precipitate for use as a leaching agent for the medium-/low-grade scheelite.

Step 3: 120 g of the grinded scheelite was added in an autoclave, and then added with sodium phosphate in an amount that is 1.5 times of the theoretical amount required to decompose scheelite and activated magnesium fluoride in an amount that is 1.5 times of the theoretical amount required to decompose scheelite, where the liquid-to-solid ratio during the reaction was 5:1 mg/l. When the reaction temperature was up to 180° C., the system was reacted at a stirring speed of 250 r/min, maintained at this temperature for 2.5 h, and filtrated to obtain residue containing calcium and magnesium and crude sodium tungstate leachate, where the tungsten leaching rate was 98.6%.

Embodiment 2

Step 1: The medium-grade scheelite (having a content of $WO_3$ of 40.6%) was grinded by a vibrating ball mill, the grain size of the grinded ore being below 325 meshes.

Step 2: Sodium fluoride solution having a concentration of 35 g/L was prepared and then added with magnesium chloride in an amount that is 1.2 times of the theoretical amount required to decompose scheelite; and, the mixture was reacted for 60 min at 60° C. and at a stirring speed of 250 r/min and then filtrated to obtain activated magnesium fluoride precipitate for use as a leaching agent for the medium-/low-grade scheelite.

Step 3: 150 g of the grinded scheelite was added in an autoclave, and then added with sodium phosphate in an amount that is 1.5 times of the theoretical amount required to decompose scheelite and activated magnesium fluoride in an amount that is 1.6 times of the theoretical amount required to decompose scheelite, where the liquid-to-solid ratio during the reaction was 5:1 mg/l. When the reaction temperature was up to 160° C., the system was reacted at a stirring speed of 300 r/min, maintained at this temperature for 4 h, and filtrated to obtain residue containing calcium and magnesium and crude sodium tungstate leachate, where the tungsten leaching rate was 96.2%.

Embodiment 3

Step 1: The medium-grade scheelite (having a content of $WO_3$ of 37.6%) was grinded by a vibrating ball mill, the grain size of the grinded ore being below 325 meshes.

Step 2: Sodium fluoride solution having a concentration of 30 g/L was prepared and then added with magnesium chloride in an amount that is 1.3 times of the theoretical amount required to decompose scheelite; and, the mixture was reacted for 50 min at 70° C. and at a stirring speed of 300 r/min and then filtrated to obtain activated magnesium fluoride precipitate for use as a leaching agent for the medium-grade scheelite.

Step 3: 150 g of the grinded medium-grade scheelite was added in an autoclave, and then added with sodium phosphate in an amount that is 1.7 times of the theoretical amount required to decompose scheelite and activated magnesium fluoride in an amount that is 1.8 times of the theoretical amount required to decompose scheelite, where the liquid-to-solid ratio during the reaction was 4:1 mg/l. When the reaction temperature was up to 220° C., the system was reacted at a stirring speed of 350 r/min, maintained at this temperature for 2.0 h, and filtrated to obtain residue containing calcium and magnesium and crude sodium tungstate leachate, where the tungsten leaching rate was 99.1%.

Embodiment 4

Step 1: The low-grade scheelite (having a content of $WO_3$ of 24.4%) was grinded by a vibrating ball mill, the grain size of the grinded ore being below 325 meshes.

Step 2: Sodium fluoride solution having a concentration of 38 g/L was prepared and then added with magnesium chloride in an amount that is 1.1 times of the theoretical amount required to decompose scheelite; and, the mixture was reacted for 40 min at 80° C. and at a stirring speed of 250 r/min and then filtrated to obtain activated magnesium fluoride precipitate for use as a leaching agent for the low-grade scheelite.

Step 3: 180 g of the grinded low-grade scheelite was added in an autoclave, and then added with sodium phosphate in an amount that is 1.5 times of the theoretical amount required to decompose scheelite and activated magnesium fluoride in an amount that is 1.3 times of the theoretical amount required to decompose scheelite, where the liquid-to-solid ratio during the reaction was 5:1 mg/l. When the reaction temperature was up to 170° C., the system was reacted at a stirring speed of 200 r/min, maintained at this temperature for 3.5 h, and filtrated to obtain residue containing calcium and magnesium and crude sodium tungstate leachate, where the tungsten leaching rate was 96.8%.

Embodiment 5

Step 1: The low-grade scheelite (having a content of $WO_3$ of 18.4%) was grinded by a vibrating ball mill, the grain size of the grinded ore being below 325 meshes.

Step 2: Sodium fluoride solution having a concentration of 35 g/L was prepared and then added with magnesium chloride in an amount that is 1.2 times of the theoretical amount required to decompose scheelite; and, the mixture was reacted for 50 min at 70° C. and at a stirring speed of 220 r/min and then filtrated to obtain activated magnesium fluoride precipitate for use as a leaching agent for the low-grade scheelite.

Step 3: 160 g of the grinded low-grade scheelite was added in an autoclave, and then added with sodium phosphate in an amount that is 2.5 times of the theoretical amount required to decompose scheelite and activated magnesium fluoride in an amount that is 2.5 times of the theoretical amount required to decompose scheelite, where the liquid-to-solid ratio during the reaction was 3:1 mg/l. When the reaction temperature was up to 200° C., the system was reacted at a stirring speed of 400 r/min, maintained at this temperature for 2.5 h, and filtrated to obtain residue containing calcium and magnesium and crude sodium tungstate leachate, where the tungsten leaching rate was 98.8%.

Embodiment 6

Step 1: The low-grade scheelite (having a content of $WO_3$ of 21.1%) was grinded by a vibrating ball mill, the grain size of the grinded ore being below 325 meshes.

Step 2: Sodium fluoride solution having a concentration of 32 g/L was prepared and then added with magnesium chloride in an amount that is 1.2 times of the theoretical amount required to decompose scheelite; and, the mixture was reacted for 40 min at 80° C. and at a stirring speed of 200 r/min and then filtrated to obtain activated magnesium fluoride precipitate for use as a leaching agent for the low-grade scheelite.

Step 3: 140 g of the grinded low-grade scheelite was added in an autoclave, and then added with sodium phosphate in an amount that is 1.6 times of the theoretical amount required to decompose scheelite and activated magnesium fluoride in an amount that is 1.3 times of the theoretical amount required to decompose scheelite, where the liquid-to-solid ratio during the reaction was 4:1 mg/l. When the reaction temperature was up to 180° C., the system was reacted at a stirring speed of 250 r/min, maintained at this temperature for 5 h, and filtrated to obtain residue containing calcium and magnesium and crude sodium tungstate leachate, where the tungsten leaching rate was 96.5%.

It can be known from the data in the embodiments that, compared with the use of ordinary magnesium fluoride as a leaching agent, the activated magnesium fluoride and sodium phosphate can better decompose the medium-/low-grade scheelite.By properly increasing the amount of sodium phosphate and the activated magnesium fluoride and increasing the reaction temperature, it is advantageous for decomposition of scheelite. Compared with the existing processes for decomposing the medium-/low-grade scheelite by using sodium hydroxide and sodium carbonate, this process can significantly reduce the consumption of leaching agents and reduce the production cost.

The foregoing embodiments are merely for describing the present invention, rather than limiting the present invention.

We claim:

1. A method for decomposing scheelite, comprising steps of:
   step (1): grinding scheelite to below 325 meshes;
   step (2): preparing activated magnesium fluoride: adding magnesium chloride in an amount that is 1.1 to 1.3 times of a theoretical amount required to decompose scheelite in a sodium fluoride solution having a concentration of 30 to 40 g/L, and reacting at 60° C. to 80° C. under stirring to generate activated magnesium fluoride; and
   step (3): adding the ground scheelite in an autoclave, adding sodium phosphate, activated magnesium fluoride and water for hydrolysis under stirring, and treating by solid-liquid separation to obtain crude sodium tungstate leachate and residue containing calcium and magnesium.

2. The method according to claim 1, wherein the content of $WO_3$ in the scheelite is 18 to 42 wt. %.

3. The method according to claim 1, wherein, in the step (2), a reaction time is 30 to 60 min, and a stirring speed is 200 to 350 r/min.

4. The method according to claim 1, wherein a consumption of the sodium phosphate is 1.5 to 2.5 times of the theoretical amount required to decompose scheelite, and a consumption of the activated magnesium fluoride is 1.2 to 2.5 times of the theoretical amount required to decompose scheelite.

5. The method according to claim 1, wherein in step (3) a reaction temperature is 160° C. to 220° C., a liquid-to-solid ratio in a reaction system is 3:1 to 5:1 ml/g, a reaction time is 1.5 h to 5 h, and a stirring speed is 200 to 400 r/min.

* * * * *